(12) United States Patent
Genco et al.

(10) Patent No.: US 12,540,592 B2
(45) Date of Patent: Feb. 3, 2026

(54) VOLUME SPLITTER FOR A FUEL DELIVERY SYSTEM

(71) Applicant: DELPHI TECHNOLOGIES IP LIMITED, St. Michael (BB)

(72) Inventors: Callisto Genco, Howald (LU); Onur Mehmet Tansug, Izmir (TR); Levent Akin, Izmir (TR); Mehmet Donmez, Izmir (TR); Ceren Ates, Izmir (TR); Tolga Sarman, Izmir (TR)

(73) Assignee: PHINIA Jersey Holdings LLC, Wilmington, DE (US)

( * ) Notice: Subject to any disclaimer, the term of this patent is extended or adjusted under 35 U.S.C. 154(b) by 0 days.

(21) Appl. No.: 18/023,128

(22) PCT Filed: Aug. 25, 2021

(86) PCT No.: PCT/EP2021/073446
§ 371 (c)(1),
(2) Date: Feb. 24, 2023

(87) PCT Pub. No.: WO2022/043356
PCT Pub. Date: Mar. 3, 2022

(65) Prior Publication Data
US 2023/0313769 A1    Oct. 5, 2023

(30) Foreign Application Priority Data

Aug. 26, 2020   (GB) ..................... 2013363

(51) Int. Cl.
*F02M 55/02*   (2006.01)
*F02M 25/022*   (2006.01)
*F02M 55/04*   (2006.01)

(52) U.S. Cl.
CPC ...... *F02M 55/025* (2013.01); *F02M 25/0228* (2013.01); *F02M 55/04* (2013.01); *F02M 2200/315* (2013.01)

(58) Field of Classification Search
CPC .. F02M 55/025; F02M 25/0228; F02M 55/04; F02M 2200/315
(Continued)

(56) References Cited

U.S. PATENT DOCUMENTS

2020/0340436 A1   10/2020   Schenck Zu Schweinsberg et al.

FOREIGN PATENT DOCUMENTS

| CN | 105339717 A | 2/2016 | |
|----|----|----|----|
| DE | 102014205179 A1 * | 9/2015 | ......... F02M 25/0228 |

(Continued)

OTHER PUBLICATIONS

International Search Report for PCT/EP2021/073446 dated Nov. 18, 2021, 2 pages.
(Continued)

*Primary Examiner* — Lindsay M Low
*Assistant Examiner* — Omar Morales
(74) *Attorney, Agent, or Firm* — WARNER NORCROSS + JUDD LLP (57) ABSTRACT

A radially deformable volume splitter of an emulsion injection common rail for a fuel injection system of a spark ignition engine. The volume splitter may be tubular and elongate, extending along a longitudinal axis from a first end to a second end. The volume splitter may comprise: a deformable longitudinal slot operable to radially deform the volume splitter from a first state for insertion into a cavity of the emulsion injection common rail to a second state for use inside the cavity; and a set of grooves, arranged on an outer surface of the volume splitter, for connecting an inlet of the cavity to one or more outlets of the cavity, in use.

13 Claims, 7 Drawing Sheets

(58) Field of Classification Search
USPC .......................................................... 123/456
See application file for complete search history.

(56) References Cited

FOREIGN PATENT DOCUMENTS

| | | | |
|---|---|---|---|
| DE | 102018212577 A1 * | 1/2020 | |
| WO | 2014175730 A1 | 10/2014 | |
| WO | 2019185218 A1 | 10/2019 | |
| WO | 2020157217 A1 | 8/2020 | |

OTHER PUBLICATIONS

Machine assisted English translation of DE102018212577A1 obtained from https://patents.google.com/patent on Feb. 23, 2023, 5 pages.
Machine assisted English translation of DE102014205179A1 obtained from https://patents.google.com/patent on Feb. 23, 2023, 5 pages.
Machine assisted English translation of WO2020157217A1 obtained from <https://patents.google.com/patent> on Jul. 23, 2024, 5 pages.

* cited by examiner

VOLUME SPLITTER FOR A FUEL DELIVERY SYSTEM

CROSS-REFERENCE TO RELATED APPLICATIONS

This application is the U.S. National Stage of International Application No. PCT/EP2021/073446 filed on 25 Aug. 2021, which claims priority to and all advantages of United Kingdom Application No. 2013363.3 filed on 26 Aug. 2020, the contents of which are incorporated herein by reference.

FIELD OF THE INVENTION

This invention relates to a common rail of a fuel delivery system and, in particular, to a volume splitter of a common rail for an emulsion injection system that delivers a water-fuel emulsion to an internal combustion engine.

BACKGROUND TO THE INVENTION

It is known to provide fluid delivery systems for conveying fuel, such as gasoline, to an internal combustion engine (ICE) of a vehicle. In a popular arrangement, the fluid delivery system is a fuel injection system that delivers fuel to the engine via an array of fuel injectors supplied with fuel from a pressurised accumulator, known as a common rail. Typically, the common rail is controlled to regulate the amount of fuel delivered to the fuel injectors and the fuel injectors are selectively controlled to inject the supply of fuel into the engine.

Modern fluid injection systems also include water injection systems that deliver water into the combustion chambers of the engine to reduce an engine knock tendency. Injecting water in this manner also provides other benefits such as increased fuel economy and engine performance, as well as a decrease in engine emissions.

In known systems, the water may be introduced by port injection (to the air intake manifold), by direct injection (to the engine cylinders) or by emulsion injection, in which water is mixed with the fuel for direct injection into the engine cylinders as a water-gasoline emulsion.

An emulsion injection system typically consumes less water and requires fewer components. However, it is important that the emulsion is evacuated from the common rail at high speed and that the emulsion is distributed evenly to the respective fuel injectors in order to maintain the homogeneity of the water-fuel emulsion.

It is against this background that the present invention has been devised.

SUMMARY OF THE INVENTION

According to an aspect of the invention, there is provided a radially deformable volume splitter of an emulsion injection common rail for a fuel injection system of a spark ignition engine. The volume splitter is tubular (i.e. hollow) and elongate, extending along a longitudinal axis from a first end to a second end. The volume splitter comprises: a deformable longitudinal slot operable (i.e. that may be used) to radially deform the volume splitter from a first state for insertion into a cavity of the emulsion injection common rail to a second state for use inside the cavity; and a set of grooves, arranged on an outer surface of the volume splitter, for connecting an inlet of said cavity to one or more outlets of said cavity, in use.

The set of grooves may include one or more grooves that define fluid delivery channels for delivering pressurised fluid, such as a water-fuel emulsion, to an array of fuel injectors connected to the one or more outlets from the cavity.

Advantageously, the deformable longitudinal slot reduces the radial stiffness of the tubular volume splitter and may therefore be operated (e.g. expanded, or contracted) to radially deform the volume splitter during installation to achieve a desired fit between the volume splitter and the cavity in the second state.

By virtue of this arrangement, it is envisaged that the invention will provide for easier manufacture of a common rail, with improved control of the fit and/or clearance between the volume splitter and the common rail. This may provide enhanced control of the fluid delivery and may enable the homogeneity of a water-fuel emulsion delivered to the fuel injectors to be maximised.

The deformable longitudinal slot may be operable to expand, and/or contract, the longitudinal slot and thereby to radially deform the volume splitter. In other words, operating the deformable longitudinal slot may comprise: expanding the longitudinal slot by urging the longitudinal slot apart; and/or contracting the longitudinal slot by urging the longitudinal slot together or closed. In other examples, the deformable longitudinal slot may be operated to change the shape of the volume splitter, for example to better fit different shaped cavities in the common rail.

In an example, the volume splitter may be resilient, for example, having been formed from a resilient material. For example, the volume splitter may be formed of metal, plastic, or a metal and plastic composite. In this manner, the volume splitter may have a rest state or shape, neither in tension or compression, and the resilience of the volume splitter may urge the volume splitter back to the rest state when the volume splitter is deformed.

Optionally, the deformable longitudinal slot may be operable to radially deform the volume splitter to the first state. The resilience of the volume splitter may be configured to urge the volume splitter to the second state for use inside the cavity. For example, the deformable longitudinal slot may be contractable to radially deform the volume splitter to the first state and the resilience of the volume splitter may be configured to urge the longitudinal slot to expand and thereby to deform the volume splitter to the second state for use inside the cavity. In another example, the longitudinal slot may be engageable with a complementary longitudinal ridge of the cavity. For example, the longitudinal slot may be urged apart from the first state to receive the longitudinal ridge of the cavity. Once expanded, the resilience of the volume splitter may be configured to urge the longitudinal slot to contract towards the first state and thereby to engage the longitudinal ridge of the cavity in the second state.

In an example, the longitudinal slot may be operable to radially deform the volume splitter to the extent that, in the second state, an outer radius of the volume splitter is greater than, or equal to, a radius of the cavity of the emulsion injection common rail. In this manner, an interference fit may be formed between the volume splitter and the cavity, in use.

In an example, the volume splitter may be configured to form a clearance fit with the cavity of the emulsion injection common rail, in the second state. The longitudinal slot of the volume splitter may be operable to radially deform the volume splitter to the extent that, in the second state, the clearance between the volume splitter and the cavity is less than, or equal to, 1 mm. Optionally, the clearance between the volume splitter and the cavity is less than, or equal to, 0.05 mm in the second state. Such clearance is sufficiently small to minimise leakage from the set of grooves and to maintain the homogeneity of a water-fuel emulsion.

The volume splitter may, for example comprise a locking formation engageable with a complementary locking formation in the cavity of the emulsion injection common rail to substantially inhibit rotation of the volume splitter relative to the cavity of the emulsion injection common rail. Advantageously, the locking formation may therefore ensure that the set of grooves remain in alignment with the inlet and the one or more outlets, maintaining the connection(s) therebetween.

Optionally, the locking formation may extends radially from the outer surface of the volume splitter for engagement with (the complementary locking formation in the form of) a complementary radial formation on a wall of the cavity. Optionally, the locking formation may extend axially from at least one of the first end, and/or the second end, of the volume splitter for engagement with a complementary axial formation in a respective end of the cavity.

In an example, the locking formation may be (arranged on the volume splitter so as to be) engageable with the complementary locking formation in the cavity in dependence on the volume splitter being oriented so that the set of grooves connect the inlet of the cavity to the one or more outlets of the cavity. In this manner, engagement of the locking formation may ensure that the volume splitter is oriented inside the cavity with the set of grooves aligned with the inlet and the one or more outlets of the cavity.

Optionally, the locking formation may be (arranged on the volume splitter so as to be) engageable with the complementary locking formation in the cavity when the volume splitter is in the second state.

In an example, the locking formation may be (arranged on the volume splitter so as to be) disengageable from the complementary locking formation in the cavity when the volume splitter is in the first state. This provides for selective removal of the volume splitter from the cavity.

In an example, the set of grooves may comprise one or more injector delivery grooves for connecting the inlet of the cavity to the one or more outlets of the cavity. Such injector delivery grooves may define one or more fluid delivery channels inside the cavity between the inlet and the one or more outlets.

In an example, the set of grooves may comprise one or more end grooves for connecting the one or more injector delivery grooves to an interior volume (i.e. accumulator volume) of the volume splitter around the first end, and/or the second end, of the volume splitter. Such end grooves may define quick linkage paths between the injector delivery grooves and the accumulator volume for providing damping of pressure pulsation when fluid is injected into the engine. Such end grooves have been found to reduce the dilution of a water-fuel emulsion in the accumulator volume.

Each end groove may extend from one of the injector delivery grooves to one of the first end and the second end of the volume splitter. A cross-sectional area of each end groove may be greater than a cross-sectional area of the connected injector delivery groove. Optionally, the cross-sectional area of each end groove may be at least twice as large as the cross-sectional area of the connected injector delivery groove. The enlarged end groove has been found to have the effect of reducing the pressure peaks inside the common rail.

According to another aspect of the present invention there is provided an emulsion injection common rail for a fuel injection system of a spark ignition engine, comprising the volume splitter described in a previous aspect of the invention. The emulsion injection common rail may include a housing that defines the cavity that the volume splitter is received within.

According to a further aspect of the present invention there is provided a method of installing a radially deformable volume splitter as described in a previous aspect of the invention in an emulsion injection common rail for a fuel injection system of a spark ignition engine. The method comprises: configuring the volume splitter in the first state for insertion into a cavity of the emulsion injection common rail; inserting the volume splitter into the cavity; and operating the deformable longitudinal slot of the volume splitter (e.g. expanding the longitudinal slot) to radially deform the volume splitter from the first state to the second state for use inside the cavity.

In an example, configuring the volume splitter in the first state may comprise operating the deformable longitudinal slot (e.g. by contracting or compressing the longitudinal slot) to radially deform the volume splitter to the first state. Operating the deformable longitudinal slot of the volume splitter to radially deform the volume splitter from the first state to the second state for use inside the cavity may comprise urging the longitudinal slot to expand, and thereby to deform the volume splitter to the second state, using the resilience of the volume splitter, for example.

It will be appreciated that preferred and/or optional features of each aspect of the invention may be incorporated alone or in appropriate combination in the other aspects of the invention also.

BRIEF DESCRIPTION OF THE DRAWINGS

In order that the invention may be more readily understood, preferred non-limiting embodiments thereof will now be described, by way of example only, with reference to the accompanying drawings, in which like features are assigned like reference numbers, and in which.

DETAILED DESCRIPTION OF EMBODIMENTS OF THE INVENTION

Embodiments of the invention relate to a common rail for an emulsion injection system and, particularly, to a common rail having a radially deformable volume splitter arranged therein.

The volume splitter is installed in a main rail cavity of the common rail with a set of grooves arranged on its outer surface that define high-speed fluid delivery channels for delivering pressurised fluid, such as a water-fuel emulsion, to an array of fuel injectors connected to respective outlets from the cavity.

Advantageously, the volume splitter includes a deformable longitudinal slot that reduces the radial stiffness of the tubular volume splitter. Accordingly, the deformable longitudinal slot may be operated (e.g. expanded, or contracted) to radially deform the volume splitter during installation. For example, the volume splitter may be configured in a first state for insertion into the cavity of the common rail and, once inside the cavity, the volume splitter may be expanded to a second state for use inside the cavity, for example achieving a desired fit between the volume splitter and the cavity in the second state.

By virtue of this arrangement, it is envisaged that the invention will provide for easier manufacture of a common rail, with improved control of the fit and/or clearance between the volume splitter and the common rail, providing enhanced control of the fluid delivery. Hence, it may be possible to maximise the homogeneity of the water-fuel emulsion delivered to the fuel injectors.

Each of the common rail arrangements described below is intended for use in an emulsion injection system for a Spark Ignition (SI) engine. However, it should be appreciated that the common rail arrangements may be suitable for other uses, including the delivery of fuel, or water, in a fluid delivery system of a Compression Ignition (CI), or SI, internal combustion engine.

Figure 1:
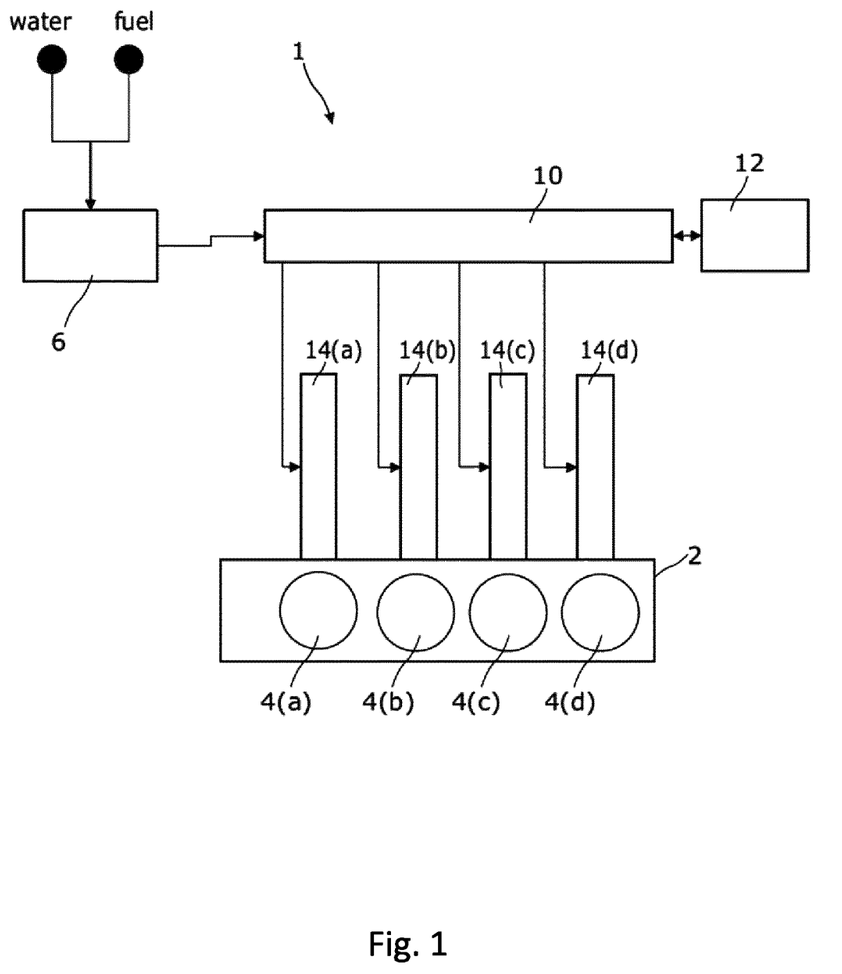
FIG. 1 schematically illustrates an example of a fuel injection system for an internal combustion engine.

To provide context for the invention, FIG. 1 shows, in simplified schematic form, a fuel injection system 1 for a spark ignition engine 2. In this example, the spark ignition engine 2 is a four-cylinder engine, having four engine cylinders 4a-d. However, as shall become clear in the following description, examples of the invention are not limited for use with a four-cylinder SI engine and may, for example, be suitable for use with any of a two, four, six, eight, ten or twelve cylinder internal combustion engine.

The fuel injection system 1 is configured to pressurise and deliver a supply of a pressurised fluid, comprising a water-fuel emulsion, to each cylinder 4a-d of the spark ignition engine 2. For this purpose, the fuel injection system 1 takes the form of an emulsion injection system and includes a high pressure pump 6, a common rail 10, a pressure sensor 12 and a set of fuel injectors 14a-d. As shown, the set of fuel injectors 14a-d includes a first 14a, a second 14b, a third 14c and a fourth fuel injector 4d and each fuel injector 14a-d is configured to inject fluid directly into a respective one of the four engine cylinders 4a-d.

In use, the high pressure pump 6 receives a supply of water and a supply of fuel, such as gasoline, that are mixed together. The high pressure pump 6 pressurises the mixture to produce a pressurised fluid comprising a water and fuel emulsion, which is delivered to the common rail 10. In this example, the water-fuel emulsion is therefore prepared by a single high pressure pump 6, prior to addition to the common rail 10. However, it shall be appreciated that, in other examples, the fluid injection system 1 may include a first high pressure pump that pressurises the fuel and a second high pressure pump that pressurises the water. The pressurised water and the pressurised fuel may be delivered to the common rail 10 separately, where the water and fuel emulsion may be formed by mixing the pressurised supply of water and the fuel together.

The common rail 10 is configured to accumulate a volume of the pressurised fluid and, principally, to deliver pressurised fluid to the set of fuel injectors 14a-d for injection into the engine 2, upon demand.

Although not shown in this example, the high pressure pump 6 and/or the common rail 10 may be operated by a control system (not shown) that controls the delivery of pressurised fluid to the set of fuel injectors 14a-d. For example, the pressure sensor 12 may monitor the pressure inside the common rail 10 and output signals to the control system that are indicative of the pressure in the common rail 10. The control system may then operate the high pressure pump 6 and/or the common rail 10 to pressurise the fluid and/or deliver the pressurised fluid to the fuel injectors 14a-d in dependence on the signals.

An example of the common rail 10 that may be used in the fluid delivery system 1 is provided in FIGS. 2 to 10, which shall now be described.

Figure 2:
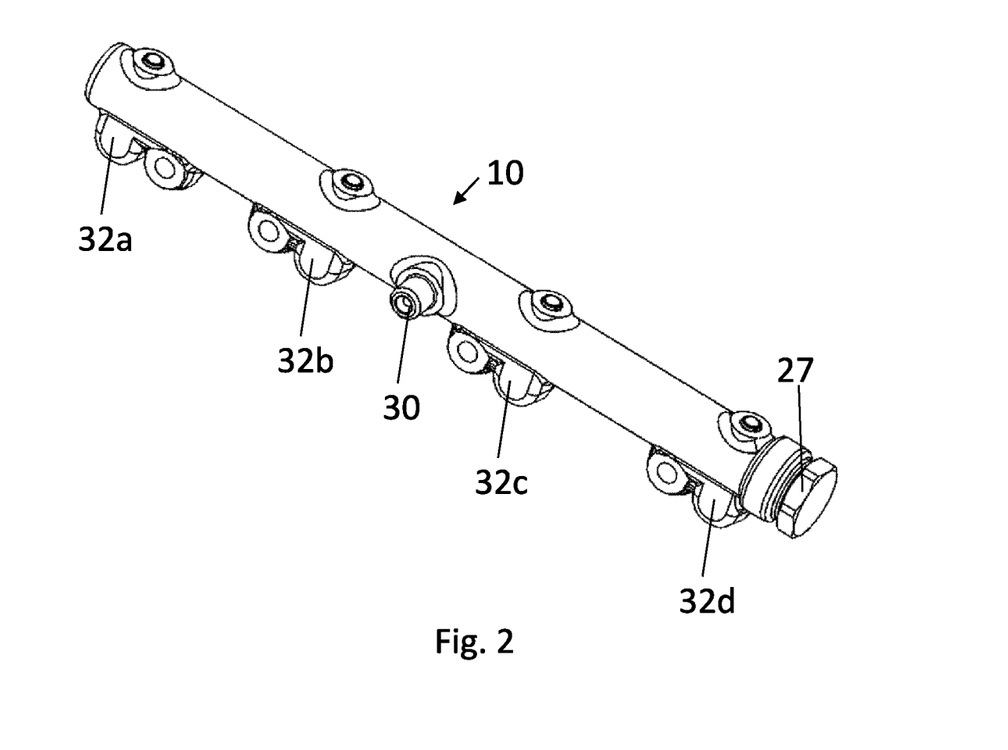
FIG. 2 illustrates an example common rail, in accordance with an embodiment of the present invention, for use in the fuel injection system shown in FIG. 1.

FIG. 2 shows a perspective view of the common rail 10, which is elongate and extends along a longitudinal axis. In this example, the common rail 10 is substantially cylindrical, as is conventional for a common rail. However, the shape of the common rail 10 is not intended to be limiting on the scope of the invention.

Figure 3:
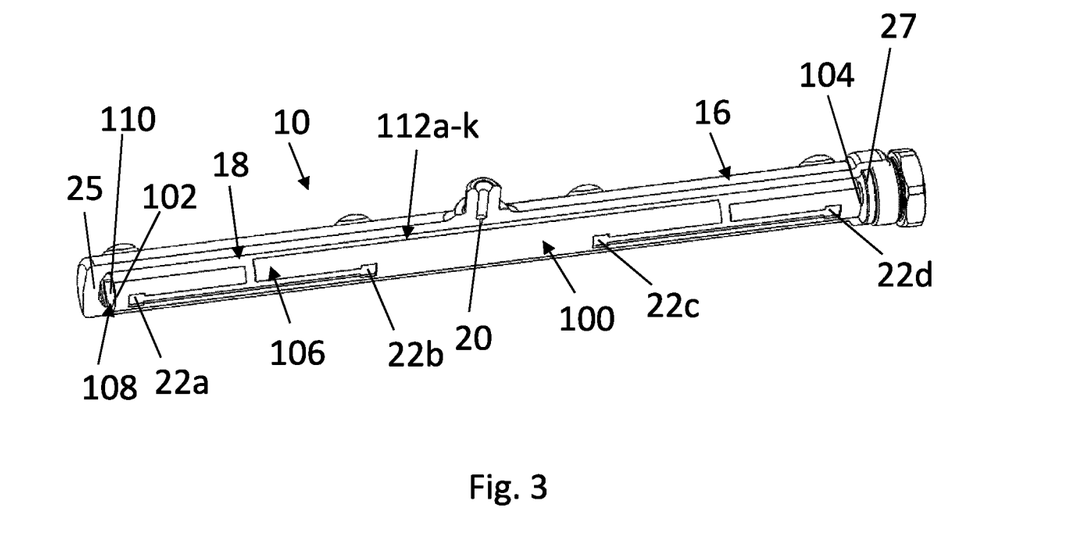
FIG. 3 illustrates a first cross-sectional view of the common rail shown in FIG. 2.
Figure 4:
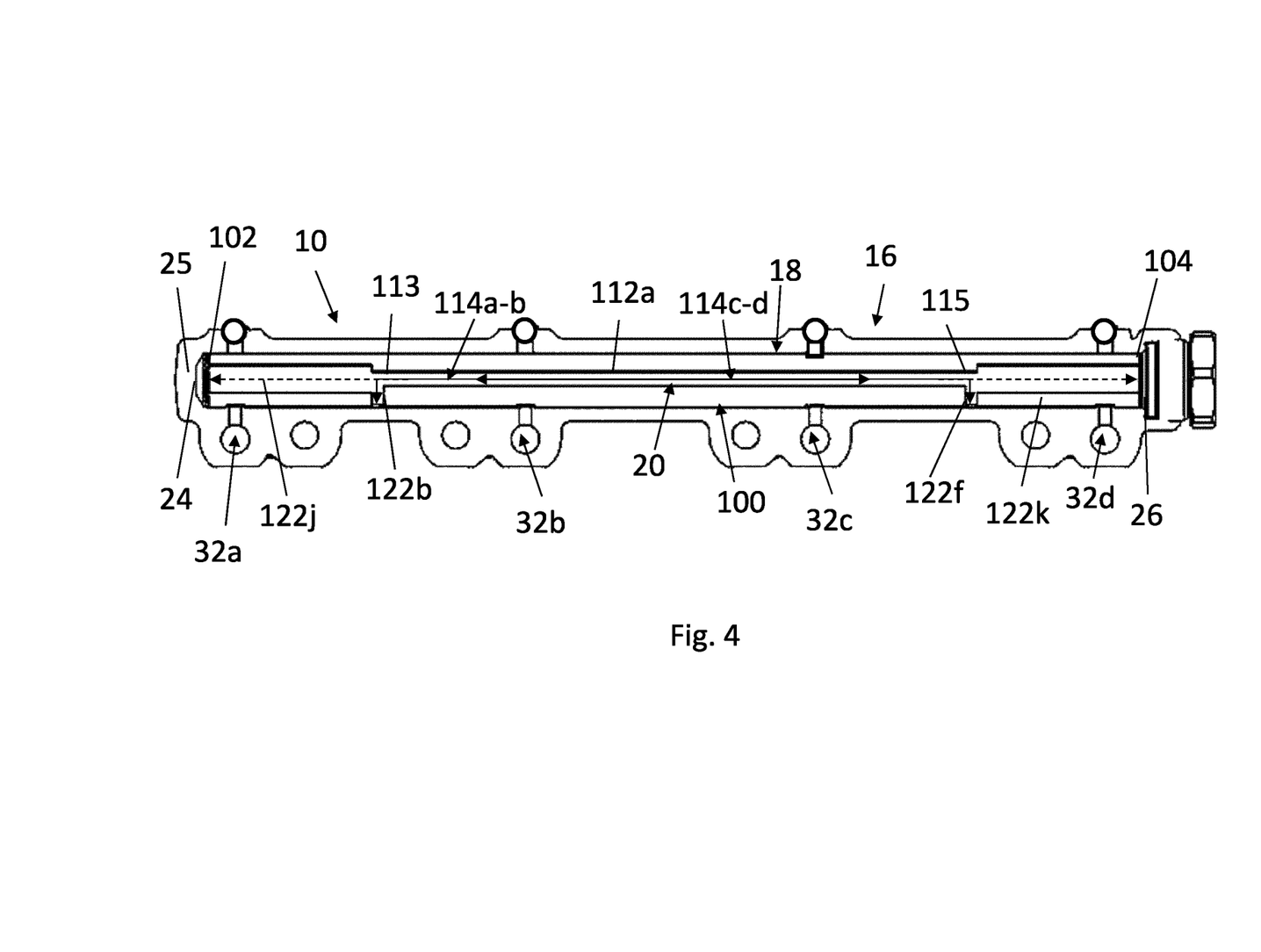
FIG. 4 illustrates a second cross-sectional view of the common rail shown in FIG. 2.
Figure 5:
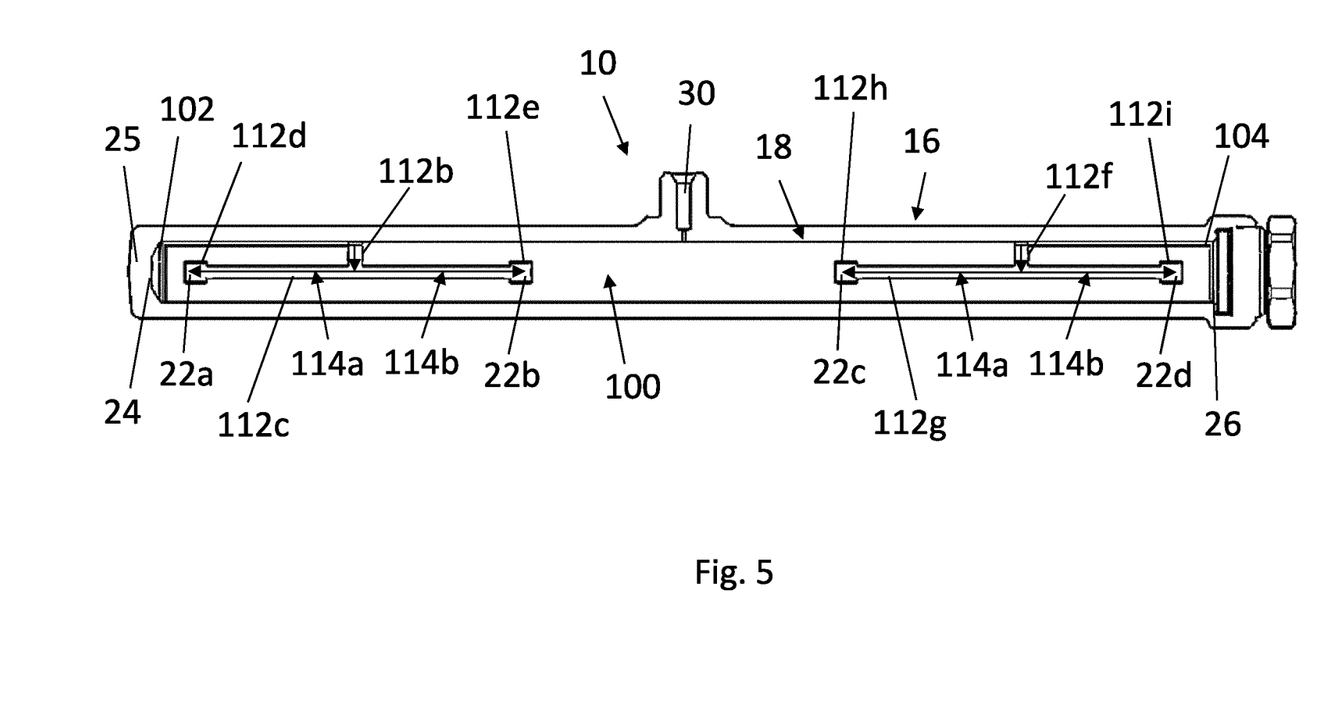
FIG. 5 illustrates a third cross-sectional view of the common rail shown in FIG. 2.

FIGS. 3 to 5 show the common rail 10 as an assembly comprising a housing 16 and a volume splitter 100 arranged inside the housing 16. The housing 16 is shown in cross-section arranged along the longitudinal axis of the common rail 10.

FIG. 3 shows a perspective view of the common rail 10, FIG. 4 shows a side view of the common rail 10 and FIG. 5 shows an top view of the common rail 10.

As shown in FIGS. 3 to 5, the housing 16 features a cavity 18 for accumulating a volume of pressurised fluid and the volume splitter 100 is arranged inside the cavity 18 to define high-speed fluid delivery channels between an inlet 20 of the cavity 18 and a plurality of outlets 22a-d from the cavity 18. The plurality of outlets 22a-d from the cavity 18 connect to respective ones of the set of fuel injectors 14a-d.

In this example, the cavity 18 is elongate and extends along the longitudinal axis of the common rail 10 from a first end 24 to a second end 26, as best shown in FIG. 4. The first end 24 of the cavity 18 is closed by an end wall 25 of the housing 16 and the second end 26 of the cavity 18 is sealed by a plug 27. In other examples, the cavity 18 may be closed by a removable sealant or plug, at each of the first and second ends 24, 26 of the cavity 18, for example for ease of manufacture.

In this example, the cavity 18 is substantially uniform along its length and the cavity 18 is defined by substantially cylindrical cavity walls formed by interior surfaces of the housing 16. However, it shall be appreciated that, in other examples, the cavity 18 may be defined by cavity walls of any other suitable shape that may define an elongate void. For example, the cavity 18 may have a circular, quadrangular or elliptical cross-section.

The inlet 20 and the plurality of outlets 22a-d are arranged along the length of the cavity 18. The inlet 20 is provided for the addition of pressurised fluid to the cavity 18 and the housing 16 includes an input spout 30 that extends from the inlet 20 for connection to the high pressure pump 6. For example, the input spout 30 may be connected to the high pressure pump 6 via a suitable supply line so as to provide the inlet 20 with a supply of pressurised fluid in response to a demand.

The plurality of outlets 22a-d are provided for the delivery of pressurised fluid from the cavity 18 to the set of fuel injectors 14a-d. Accordingly, the housing 16 may include a plurality of output spouts 32a-d, as shown in FIG. 4, with each output spout 32a-d extending from a respective outlet 22a-d for connection to a respective fuel injector 14a-d.

In this example, the plurality of outlets 22a-d includes a first outlet 22a, a second outlet 22b, a third outlet 22c and a fourth outlet 22d corresponding to the set of four fuel injectors 14a-d. However, it shall be appreciated that the plurality of outlets 22a-d may vary with respect to the application of the common rial 10.

The plurality of outlets 22a-d may be coplanar with the longitudinal axis of the common rail 10, as shown in FIGS. 3 and 4, and the inlet 20 may be spaced from the plurality of outlets 22a-d circumferentially around the cylindrical cavity walls. For example, the inlet 20 to the cavity 18 may be arranged on an orthogonal portion of the cavity walls to the plurality of outlets 22a-d, as shown with reference to FIGS. 4 and 5.

Significantly, the inlet 20 to the cavity 18 is arranged symmetrically with respect to the plurality of outlets 22a-d. More specifically, the distance between the first and second outlets 22a,b is equal to the distance between the third and fourth outlets 22c,d and the inlet 20 is arranged equidistantly between the second and third outlets 22b,c, producing a symmetric arrangement about the inlet 20. As shall become clear, the symmetric arrangement helps to maintain the homogeneity of the water-fuel emulsion, in use.

Now considering the volume splitter 100 in more detail, the volume splitter 100 is elongate and extends from a first end 102 to a second end 104, along a longitudinal axis, as shown in FIGS. 3 to 5.

The volume splitter 100 is tubular, having an outer surface 106 and an axial opening 108 that extends along the length of the volume splitter 10 to define an inner surface 110, best shown in FIG. 3. In this example, the volume splitter 100 is substantially cylindrical so as to complement the cylindrical cavity walls and, accordingly, the inner and outer surfaces 110, 106 are substantially cylindrical.

As shall become clear in the following description, the volume splitter 100 defines various formations inside the cavity 18 that are configured to optimise the delivery of the pressurised fluid to the fuel injectors 14a-d.

For example, the volume splitter 100 forms an accumulator volume inside the cavity 18, defined by the inner surface 110 of the volume splitter 100. In use, the accumulator volume 110 is filled with a volume of pressurised fluid and acts as a damping chamber (in a conventional manner) to provide damping of the pressure pulsations resulting from the injection of the pressurised fluid into the engine cylinders 4a-d.

The skilled person shall appreciate that the volume required to effectively damp the pressure pulsations shall depend on the specific use of the common rail 10 and that the volume splitter 100 may be adapted accordingly to suit such use. For example, the thickness of the volume splitter 100 may be reduced to form a larger accumulator volume 110 inside the cavity 18.

The volume splitter 100 also includes a set of grooves 112a-k arranged on the outer surface 106 of the volume splitter 100 (shown in FIGS. 3 to 5) for connecting the inlet 20 of the cavity 18 to the plurality of outlets 22a-d.

In this example, the set of grooves 112a-k includes an inlet groove 112a aligned with the inlet 20 to the cavity 18, a first subset of grooves 112b-e that connect to the first and second outlets 22a,b, and a second subset of grooves 112f-i that connect to the third and fourth outlets 22c,d, as shown in FIGS. 4 and 5.

The inlet groove 112a extends axially, along the length, of the volume splitter 100 from a first end 113 to a second end 115, with the inlet 20 to the cavity 18 being arranged equidistantly between the first and second ends 113, 115. In this manner, each end 113, 115 of the inlet groove 112a is provided with an equal supply of pressurised fluid from the inlet 20.

At the first end 113, the inlet groove 112a connects to the first subset of grooves 112b-e and, at the second end 115, the inlet groove 112a connects to the second subset of grooves 112f-i.

The first subset of grooves 112b-e includes a first groove 112b, a second groove 112c, a third groove 112d and a fourth groove 112e. The first groove 112b is arranged equidistantly along the length of the volume splitter 100 between the first and second outlets 22a,b and extends around the circumference of the volume splitter 100 from the inlet groove 112a to the second groove 112c. The second groove 112c extends axially between the third and fourth grooves 112d,e, and the third and fourth grooves 112d,e extend circumferentially around the volume splitter 100 for connection to the first and second outlets 22a,b. In this manner, the inlet groove 112a and the first, second, and third grooves 112b-d collectively define a first fluid delivery channel 114a, connecting the inlet 20 to the first outlet 22a. The inlet groove 112a and the first, second, and fourth grooves 112b,c,e collectively define a second fluid delivery channel 114b connecting the inlet 20 to the second outlet 22b.

The second subset of grooves 112f-i is substantially identical to the first subset of grooves 112b-e but extends from second end 115 of the inlet groove 112a to connect to the third and fourth outlets 22c,d. In this manner, the second subset of grooves 112f-i defines a third fluid delivery channel 114c connecting the inlet 20 to the third outlet 22c and a fourth fluid delivery channel 114d connecting the inlet 20 to the fourth outlet 22d.

In this manner, the set of grooves 112a-k define a plurality of fluid delivery channels 114a-d for delivering pressurised fluid from the inlet 20 of the cavity 18 to the plurality of outlets 22a-d.

Each fluid delivery channel 114a-d defines a relatively short and narrow, i.e. low volume, path through the relatively large volume of the cavity 18. Accordingly, the plurality of fluid delivery channels 114a-d minimise the time taken to deliver the pressurised fluid from the inlet 20 to the respective outlet 22a-d.

Importantly, the plurality of fluid delivery channels 114a-d are substantially identical and equivolume, defining the same volume through which fluid flows from the inlet 20 to each of the respective outlets 22a-d. This has the effect of maximising the homogeneity of the water-fuel emulsion delivered to the set of fuel injectors 14a-d.

It shall be appreciated that the grooves forming the first and second subsets of grooves 112b-e, 112f-i may substantially match one another, with corresponding one of the grooves having equal widths, lengths, and/or depths (extending radially into the outer surface 106 of the volume splitter 100) to ensure that the fluid delivery channels 114a-d are substantially equivolume.

Furthermore, it shall be appreciated that the example groove arrangement, described above, is only exemplary and, in other examples, the set of grooves 112a-k may take various forms defining a plurality of equivolume fluid delivery channels 114a-d between the inlet 20 and the plurality of outlets 22a-d.

The set of grooves 112a-k may also include a first end groove 112j and a second end groove 112k, as shown in FIGS. 3 and 4, for connecting the inlet 20 to the accumulator volume 110 around the first and second ends 102, 104 of the volume splitter 100.

As shown in FIGS. 3 and 4, the first end groove 112j extends from the first end 102 of the volume splitter 100 and connects to the first end 113 of the inlet groove 112a (at the junction between the inlet groove 112a and the first groove 112b of the first subset of grooves 112b-e). The second end groove 112k extends in a symmetrical manner from the second end 104 of the volume splitter 100 and connects to the second end 115 of the inlet groove 112a (at the junction between the inlet groove 112a and the second subset of grooves 112f-i).

In this manner, the first and second end grooves 112j,k are configured to provide first and second respective linkage paths (shown by dashed lines FIG. 3) between the inlet 20 and the accumulator volume 110 (around the first and second ends of the volume splitter 100), as shown in FIGS. 3 and 4. The linkage paths fluidly connect the fluid delivery channels 114a-d to the accumulator volume 110 and act to damp the pressure pulsations when the pressurised fluid is injected into the engine cylinders 4a-d. Advantageously, the inventors have found that the ends grooves 112j,k have the effect of minimising the water dilution in the accumulator volume 110.

In another example, the volume splitter 100 may additionally, or alternatively, include one or more orifices (not shown) extending through the volume splitter 100 to define linkage paths between the fluid delivery channels 114a-d and the accumulator volume 110. The inventors have found that such orifices provide effective damping of the pressure pulsations. However, in comparison, the orifices produce more water dilution in the accumulator volume 110 than the end grooves 112j,k.

The inventors have also found that relatively large end grooves 112j,k have the advantageous effect of reducing pressure spikes and damping the pressure pulsations effectively. In particular, the cross-sectional area of each end groove 112j,k, may be larger than the cross-sectional area of the inlet groove 112a to reduce the pressure during an injection event. Preferably, the cross-sectional area of each end groove 112j,k may be at least twice the cross-sectional area of the inlet groove 112a. For example, each end groove 112j,k may have the same depth as the inlet groove 112a, but each end groove 122j,k may be at least twice as wide (extending around the circumference of the volume splitter 100) as the inlet groove 112a.

It shall be appreciated that, in order for the volume splitter 100 to function as intended, it is important to minimise, or at least control, the clearance between the outer surface 106 of the volume splitter 100 and the cavity walls of the cavity 18. For example, pressurised fluid will leak from the plurality of fluid delivery channels 114a-d if there is clearance between the volume splitter 100 and the cavity 18. The leakage has the effect of reducing the homogeneity of the water-fuel emulsion and increasing the delivery time between the inlet 20 and the plurality of outlets 22a-d.

Advantageously, to mitigate, or at least control, the leakage, the volume splitter 100 of the present invention includes a deformable longitudinal slot 116 that is operable, i.e. may be used, to radially deform the volume splitter 100 so as to form a desired fit in the cavity 18, as shall now be described in more detail with reference to FIGS. 6 to 9.

Figures 6, 7:
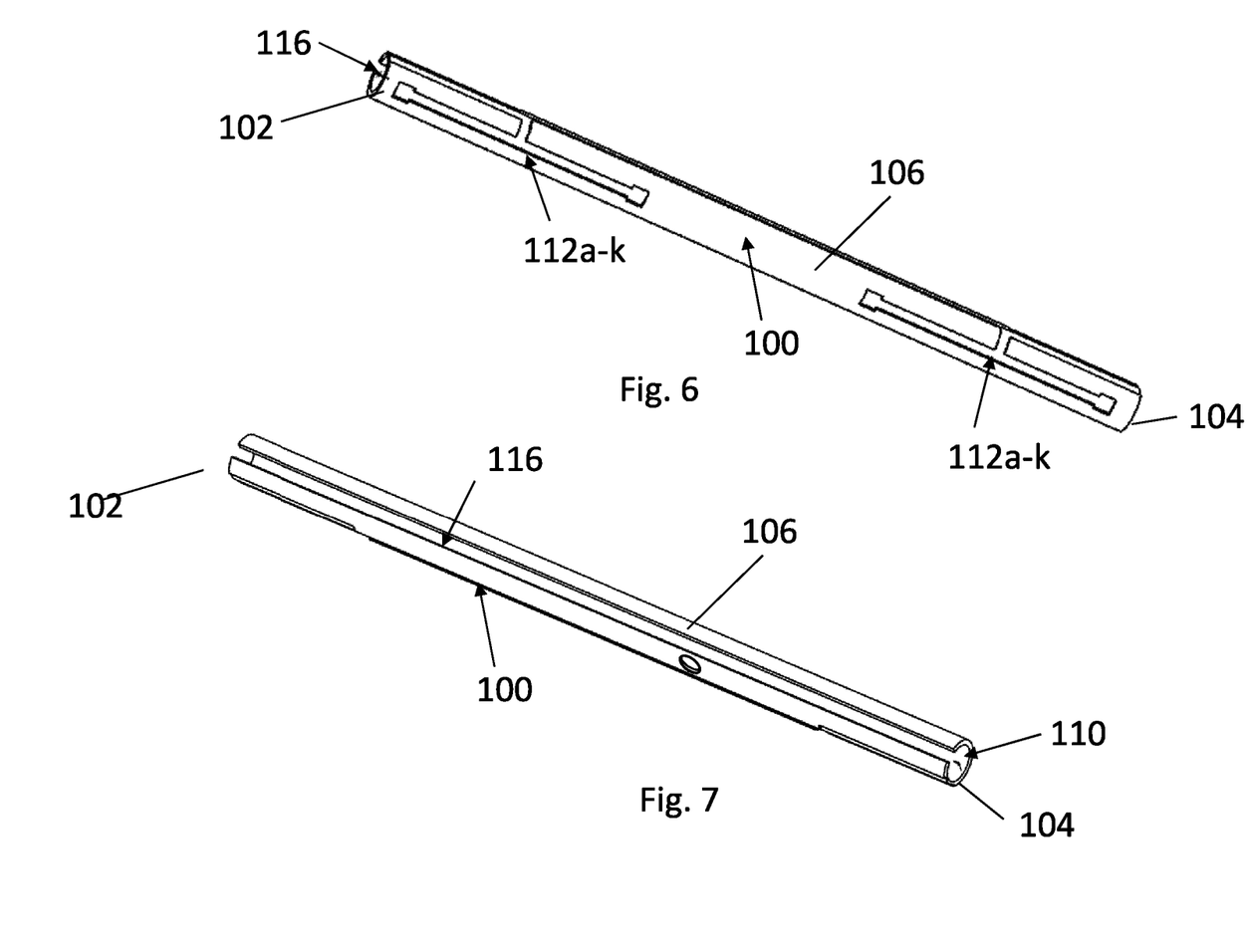
FIG. 6 illustrates a first perspective view of an example volume splitter of the common rail shown in FIG. 2 in accordance with an embodiment of the invention.
FIG. 7 illustrates a second perspective view of the volume splitter shown in FIG. 6.

FIG. 6 shows a first perspective view of the volume splitter 100 and FIG. 7 shows a second perspective view of the volume splitter 100 rotated through almost 180 degrees about its longitudinal axis.

As shown in FIG. 7, the longitudinal slot 116 extends from the first end 102 of the volume splitter 100 to the second end 104, thereby splitting the volume splitter 100 along its length. The longitudinal slot 116 has the effect of reducing the radial stiffness of the tubular volume splitter 100 and may be deformed (e.g. expanded, or urged apart) to increase the effective radius of the volume splitter 100. The longitudinal slot 116 may also be deformed to effectively reduce the radius of the volume splitter 100, for example by contracting the longitudinal slot 116, or otherwise urging the longitudinal slot 116 together, as shall become clear.

It shall be appreciated that the volume splitter 100 may be formed by bending a strip of suitably prepared material into a tubular shape or otherwise cutting the longitudinal slot 116 along the length of a tube.

The deformable longitudinal slot 116 may therefore be used to insert the volume splitter 100 into the cavity 18 of the housing 16 and to achieve a desired fit between the volume splitter 100 and the cavity 18 thereafter. This installation process is described in more detail with additional reference to FIGS. 8 and 9.

Figure 8:
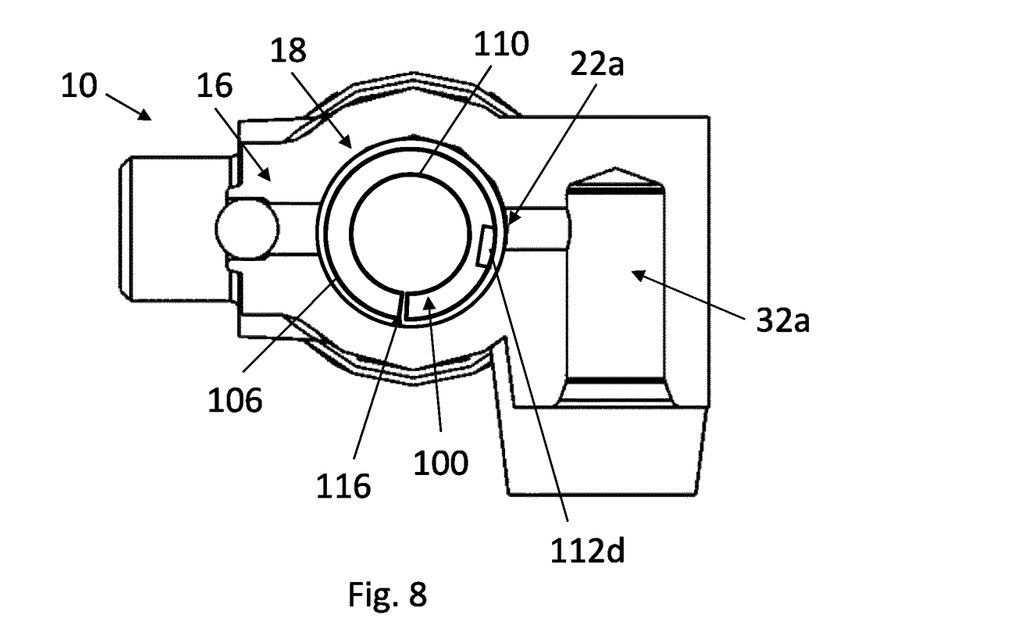
FIG. 8 illustrates a cross-sectional view of the common rail, shown in FIG. 2, with the volume splitter, shown in FIG. 6, arranged in a first state inside the common rail.

FIG. 8 shows a cross-sectional view of the common rail 10, with the volume splitter 100 arranged inside the cavity 18 with enough clearance for the volume splitter 10 to move substantially uninhibited.

For this purpose, the volume splitter 100 may be configured in a first state, having a radius that is smaller than the radius of the cavity 18. In this state, the volume splitter 100 may be introduced into the cavity 18 through the open second end 24 of the cavity 18 and suitably positioned inside the cavity 18.

Thereafter, the longitudinal slot 116 may be urged apart to increase the radius of the volume splitter 100 to a second state that provides a desired fit between the volume splitter 100 and the cavity 18.

Figure 9:
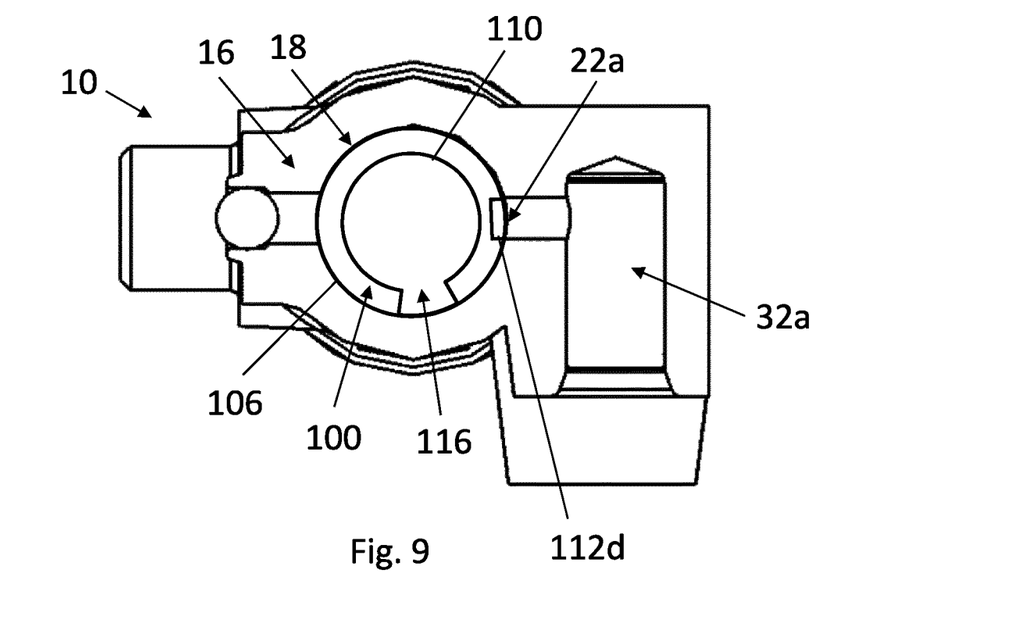
FIG. 9 illustrates a cross-sectional view of the common rail, shown in FIG. 2, with the volume splitter, shown in FIG. 6, arranged in a second state inside the common rail.

FIG. 9 shows a cross-sectional view of the common rail 10, with the volume splitter 100 arranged in the second state inside the cavity 18. In this example, the longitudinal slot 116 is urged apart to the extent that the radius of the volume splitter 100 is greater than, or equal to, the radius of the cavity 18 in the second state. In this manner, an interference fit is formed between the volume splitter 100 and the cavity 18, with no clearance between the outer surface 106 of the volume splitter 100 and the cavity 18. In other examples, the longitudinal slot 116 may be urged apart to the extent that a clearance fit is formed between the volume splitter 100 and the cavity 18, with the clearance between the volume splitter 100 and the cavity 18 being less than, or equal to, 1 mm. Preferably, the longitudinal slot 116 may be urged apart to the extent that the clearance is less than, or equal to, 0.05 mm to maintain the homogeneity of the water-fuel emulsion.

For context, the longitudinal slot 116 may be operated, as described above, to increase the radius of the volume splitter 100 by at least 5-10% between the first state and the second state, preferably by at least 10-15%, but generally not more than 20%.

It shall be appreciated that the volume splitter 100 may be expanded to the second state by various means but, to give an example, the volume splitter 100 may be formed of a resilient material that acts to urge the volume splitter 100 towards a rest state, that is neither in tension nor compression.

Accordingly, to form an interference fit between the cavity 18 and the volume splitter 100, the radius of the volume splitter 100 may be greater than, or equal to, the radius of the cavity 18 in the rest state. Hence, the volume splitter 100 may be compressed to contract the longitudinal slot 116 and deform the volume splitter 100 to the first state for insertion into the cavity 18, as shown in FIG. 8. Upon removal of the radial compression force, the longitudinal slot 116 may expand inside the cavity 18 towards the rest state due to the resilience of the volume splitter 100. In doing so, the radius of the volume splitter 100 increases to the extent that the volume splitter 100 engages the cavity 18 in the second state and forms an interference fit therewith, as shown in FIG. 9.

It shall be appreciated that the second state may be identical to the rest state in this example, or the second state may be a state of some compression such that the resilience of the volume splitter 100 urges the volume splitter 100 to expand against the cavity 18.

For context, the longitudinal slot 116 may be contracted, in the first state, to the extent that a span of the longitudinal slot 116 reduces by at least 50% from the rest state, preferably by at least 70%, but generally not more than 90%. In the second state, the longitudinal slot 116 may return to the original span in the rest state, or at least 75% of the original span, for example.

To provide such resilience, the volume splitter 100 may be formed of a metal, a (heat resistant) plastic, or a composition of materials. For example, the volume splitter 100 may comprise a sheet metal inner and an outer plastic coating, that may be moulded around the metal inner to insulate the metal inner from the water-fuel emulsion. The plastic coating may have no chemical affinity to gasoline or water. In this manner, the metal may be selected from a group of suitably resilient metals that may or may not be corrosion resistant.

It shall be appreciated that the metal may be selected so as to withstand the pressure during an injection event and to provide sufficient resilience to return to the rest state following insertion into the cavity 18. The plastic coating may be selected from a range of plastic materials having high-temperature resistance and sufficient abrasion and erosion resistance to withstand the erosion that may otherwise occur as the pressurised fluid flows through the plurality of fluid delivery channels 114a-d. Furthermore, the materials of the metal and the plastic coating may be matched so as to be complementary to one another, ensuring that the volume splitter 100 has suitable resilience and robustness.

It is also important that the volume splitter 100 is rotationally locked, in use, relative to the cavity 18 so that the set of grooves 112a-k remain in alignment with the inlet 20 and the plurality of outlets 22a-d. Such rotational constraint is required because the longitudinal slot 116 precludes grooves that extend circumferentially around the volume splitter 100 (as in conventional volume splitters). Instead, the set of grooves 112a-k are arranged on a portion of the outer surface 106 of the volume splitter 100 that is uninterrupted by the longitudinal slot 116, as shown in FIG. 6.

Consequently, the volume splitter 100 must be maintained at a certain orientation, or range of orientations, inside the cavity 18 to ensure that the inlet 20 and the plurality of outlets 22a-d remain aligned with the respective connecting grooves 112a,d,e,h,i.

For this purpose, the volume splitter 100 may include a locking formation that engages a complementary formation in the cavity 18 to substantially inhibit relative rotation. For example, the volume splitter 100 and the housing 16 may include a pair of mutually engaging complementary locking formations that may extend between the cavity 18 and the volume splitter 100 to substantially inhibit relative rotation. Such locking formations may extend radially between the cavity 18 and the volume splitter 100 or longitudinally between the first and/or second ends 102, 104 of the volume splitter 100 and the cavity 18.

Figure 10:
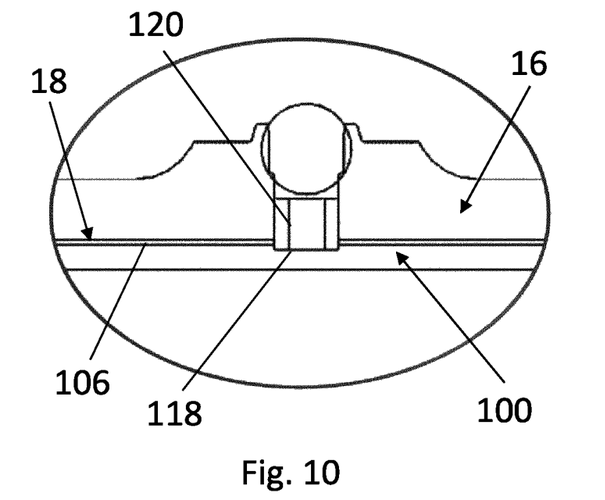
FIG. 10 illustrates a detailed cross-sectional view of an example pair of complementary locking formations arranged between the volume splitter, shown in FIG. 6, and a housing of the common rail, shown in FIG. 2.

By way of example, FIG. 10 shows a detailed cross-sectional view of the volume splitter 100 arranged inside the cavity 18.

As shown in FIG. 10, the volume splitter 100 may include a radially extending recess 118 in the outer surface 106 and the housing 16 may include a complementary radially extending protrusion 120, in the form of a pin. The radially extending protrusion 120 may be configured to engage the recess 118 in dependence on the volume splitter 100 being suitably oriented in the cavity 18, i.e. with the set of grooves 112a-k being aligned with the inlet 20 and the plurality of outlets 22a-d, and the volume splitter 100 being expanded to the second state. Once engaged with the recess 118, the radially extending protrusion 120 may substantially inhibit rotation of the volume splitter 100 inside the cavity 18. The radially extending protrusion 120 may disengage the recess 118 when the volume splitter 100 is compressed to the first state, allowing the volume splitter 100 to move uninhibited with the cavity 18.

It shall be appreciated that, although the volume splitter 100 may be installed in the cavity 18 with an interference fit that inhibits rotation of the volume splitter 100 within the cavity 18, the locking formations 118, 120 may be included between the volume splitter 100 and the cavity 18 as an auxiliary locking mechanism that inhibits relative rotation. For example, the locking formations 118, 120 may inhibit rotation of the volume splitter 100 in the cavity 18 in the event that the pressure in the common rail 10 is large enough to exceed the friction of the interference fit. If the volume splitter 100 is installed in the cavity 18 with a clearance fit, that allows some rotation of the volume splitter 100, it shall be appreciated that the locking formations 118, 120 may be engaged to substantially inhibit such rotation.

Figure 11:
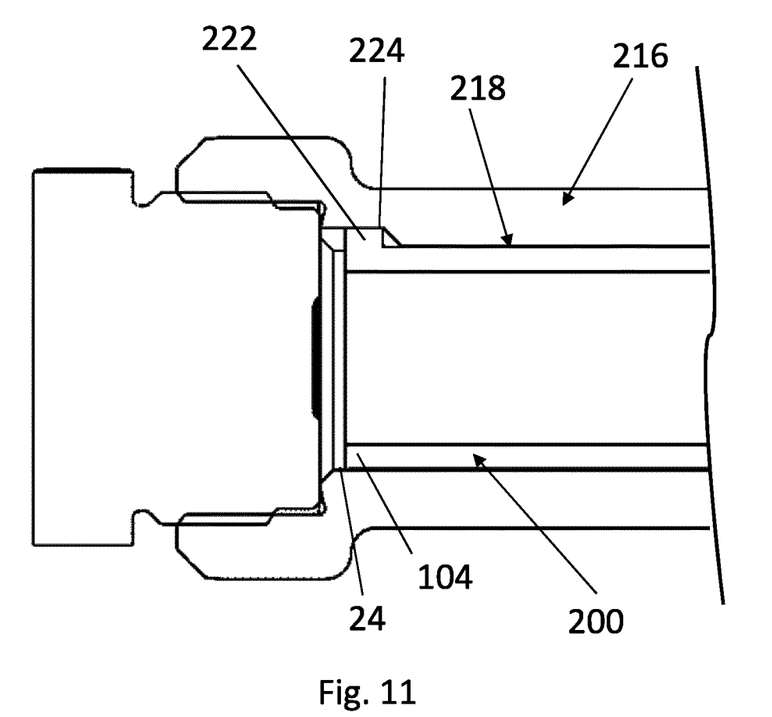
FIG. 11 illustrates a detailed cross-sectional view of another example pair of complementary locking formations arranged between the volume splitter, shown in FIG. 6, and a housing of the common rail, shown in FIG. 2.

However, this arrangement is not intended to be limiting and FIG. 11 shows a detailed cross-sectional view of another example volume splitter 200 arranged inside the cavity 218 of another example housing 216.

The volume splitter 200 and the housing 216 may be substantially as described in the previous example and like references are used to indicate like features in the following description. In this example, the volume splitter 200 may include a locking formation in the form of a radial protrusion 222 on the second end 104 of the volume splitter 200. As shown, the housing 216 may include a complementary recess 224 at the second end 24 of the cavity 218 and the radial protrusion 222 may be received in the recess 224 to substantially inhibit rotation of the volume splitter 200 within the cavity 218.

Once the volume splitter 100 has been suitably installed in the cavity 18 of the housing 18, the common rail 10 may be operated as follows.

In response to a demand for a supply of pressurised fluid at the fuel injectors 4a-d, the high pressure pump 6 of the fuel injection system 1 is configured to deliver a supply of pressurised fluid, comprising a water and fuel emulsion, to the inlet 20.

The pressurised fluid then enters the inlet groove 112a of the volume splitter 100 and splits into two equal parts. A first part travels along the first and second fluid delivery channels 114a,b in equal proportions to the first and second outlets 22a,b. A second part travels, in equal proportions, along the third and fourth delivery channels 114c,d, to the third and fourth outlets 22c,d.

It shall be appreciated that the plurality of outlets 22a-d receive equal volumes of the pressurised fluid because the inlet 20 is arranged equidistantly between the first and second ends 116, 118 of the inlet groove 112a and the plurality of fluid delivery channels 114a-d define equal volumes through which pressurised fluid flows from the inlet 20 to the respective outlets 22a-d.

Accordingly, an equal volumetric flow rate of pressurised fluid is provided to each of the fuel injectors 14a-d, which produces a parallel, as opposed to a series, injection arrangement. The parallel injection arrangement improves the homogeneity of the water and fuel emulsion injected from the fuel injectors 14a-d.

Furthermore, the volume through which pressurised fluid flows in each fluid delivery channel 114a-d is minimised, whilst not creating excessive back pressure, so that each fluid delivery channel 114a-d defines a high speed flow path through the cavity 18 that minimises the time it takes to deliver the pressurised fluid to the fuel injectors 14a,b (e.g. in response to a demand). This short response time is advantageous for several reasons. For example, the short response time maximises the homogeneity of the water and fuel emulsion in the pressurised fluid, which has a tendency to separate, breaking down the homogeneity of the mixture, if the pressurised fluid takes too long to reach the fuel injectors 14a-d.

To further reduce the response time, the high pressure pump 6 may be configured to deliver the pressurised fluid at high pressure, so that the fluid flows through the fluid delivery channels 114a-d at a fast rate. However, this high pressure flow of pressurised fluid creates large pressure pulsations as the fluid enters the cavity 18. Advantageously, the end grooves 112j,k define linkage paths between the inlet groove 112a and the accumulator volume 110, which contains a volume of pressurised fluid that dampens the pressure pulse. If the pressure pulse is not damped, the homogeneity of the pressurised fluid may be affected.

After the pressurised fluid is injected into the engine 2, pressurised fluid may pass from the fluid delivery channels 114a-d into the accumulator volume 110 to maintain the effective damping volume. For example, the excess pressurised fluid may flow along the first and second end grooves 112j,k and around the first and second ends 102, 104 of the volume splitter 100 into the accumulator volume 110.

It will be appreciated by a person skilled in the art that the invention could be modified to take many alternative forms to that described herein, without departing from the scope of the appended claims.

In another example, the cavity 18 may include a longitudinal ridge that is complementary to the longitudinal slot 116 of the volume splitter 100. The longitudinal ridge may be engaged with the longitudinal slot 116 to act as a locking formation that inhibits rotation of the volume splitter 100 inside the cavity 18 and/or to urge the longitudinal slot 116 apart and thereby form the desired fit between the cavity 18 and the volume splitter 100 in the second state. For example, the volume splitter 100 may be formed of a resilient material and, in the rest state, the longitudinal slot 116 may be too narrow to receive the longitudinal ridge. Accordingly, the longitudinal slot 116 may be expanded for insertion into the cavity 18 and engaged with the longitudinal ridge. Thereafter, the resilience of the volume splitter 100 may urge the longitudinal slot 116 closed, but the longitudinal slot 116 may kept apart by the longitudinal ridge. Hence, the volume splitter 100 may maintain a larger radius that engages the cavity 18 to form a desired fit, such as an interference fit. It shall be appreciated that the engagement between the longitudinal slot 116 and the longitudinal ridge may substantially inhibit rotation of the volume splitter 100 within the cavity 18.

REFERENCES USED

1—Fluid injection system
2—Spark ignition engine
4(a-d)—Engine cylinders
6—High pressure pump
10—Common rail
12—Pressure sensor
14(a-d)—Fuel injectors
16—Common rail housing
18—Cavity
20—Inlet
22a-d—Plurality of outlets
24—First end
25—End wall
26—Second end
27—Plug
30—Input spout
32a-d—Output spouts
100—Volume splitter
102—First end of volume splitter
104—Second end of volume splitter
106—Outer surface of volume splitter
108—Opening
110—Inner surface of volume splitter/accumulator volume
112a-k—Set of grooves
113—First end (of inlet groove)
114a-d—Plurality of fluid delivery channels
115—Second end (of inlet groove)
116—Longitudinal slot
118—Recess
120—Protrusion
200—Volume splitter (second example)
216—Housing (second example)
218—Cavity (second example)
222—Protrusion
224—Recess

The invention claimed is:
1. A radially deformable volume splitter of an emulsion injection common rail for a fuel injection system of a spark ignition engine, wherein the volume splitter is tubular and elongate, extending along a longitudinal axis from a first end to a second end; and wherein the volume splitter comprises:
a deformable longitudinal slot operable to radially deform the volume splitter from a first state for insertion into a cavity of the emulsion injection common rail to a second state for use inside the cavity; and a set of grooves, arranged on an outer surface of the volume splitter, for connecting an inlet of said cavity to one or more outlets of said cavity, in use, the set of grooves comprising:
an inlet groove for connecting to the inlet of the cavity, the inlet groove extending axially from a first end to a second end; and
first and second end grooves for connecting the inlet groove to an interior volume of the volume splitter around the first end and the second end of the volume splitter;
wherein the first end groove extends from the first end of the volume splitter to the inlet groove, the second end groove extends from the second end of the volume splitter to the inlet groove, the first end groove connecting to the first end of the inlet groove and the second end groove connecting to the second end of the inlet groove thereby fluidly connecting the inlet groove to the interior volume of the volume splitter;
wherein a cross-sectional area of the first end groove is greater than a cross-sectional area of the connected inlet groove, and a cross-section area of the second end groove is greater than a cross-sectional area of the connected inlet groove.

2. The volume splitter according to claim 1, wherein the deformable longitudinal slot is operable to expand, and/or contract, the longitudinal slot and thereby to radially deform the volume splitter.

3. The volume splitter according to claim 1, wherein the volume splitter is formed from a resilient material.

4. The volume splitter according to claim 3, wherein the deformable longitudinal slot is operable to radially deform the volume splitter to the first state; and wherein the resilience of the volume splitter is configured to urge the volume splitter to the second state for use inside the cavity.

5. The volume splitter according to claim 1, wherein the longitudinal slot is operable to radially deform the volume splitter to the extent that, in the second state, an outer radius of the volume splitter is greater than, or equal to, a radius of the cavity of the emulsion injection common rail so as to form an interference fit between the volume splitter and the cavity, in use.

6. The volume splitter according to claim 1, further comprising a locking formation engageable with a complementary locking formation in the cavity of the emulsion injection common rail to inhibit rotation of the volume splitter relative to the cavity of the emulsion injection common rail.

7. The volume splitter according to claim 6, wherein the locking formation extends radially from the outer surface of the volume splitter for engagement with a complementary radial formation on a wall of the cavity or the locking formation extends axially from at least one of the first end, and/or the second end, of the volume splitter for engagement with a complementary axial formation in a respective end of the cavity.

8. The volume splitter according to claim 6, wherein the locking formation is engageable with the complementary locking formation in the cavity in dependence on the volume splitter being oriented so that the set of grooves connect the inlet of the cavity to the one or more outlets of the cavity.

9. The volume splitter according to claim 6, wherein the locking formation is engageable with the complementary locking formation in the cavity when the volume splitter is in the second state.

10. The volume splitter according to claim 9, wherein the locking formation is disengageable from the complementary locking formation in the cavity when the volume splitter is in the first state.

11. The volume splitter according to claim 1, wherein the cross-sectional area of each end groove is at least twice as large as the cross-sectional area of the connected injector delivery groove.

12. An emulsion injection common rail for a fuel injection system of a spark ignition engine, comprising the volume splitter of claim 1.

13. A method of installing the radially deformable volume splitter according to claim 1 in an emulsion injection common rail for a fuel injection system of a spark ignition engine, the method comprising:
configuring the volume splitter in the first state for insertion into a cavity of the emulsion injection common rail;
inserting the volume splitter into the cavity; and
operating the deformable longitudinal slot of the volume splitter to radially deform the volume splitter from the first state to the second state for use inside the cavity.

* * * * *